United States Patent [19]

Cogan

[11] 4,163,875
[45] Aug. 7, 1979

[54] TELEPHONE HANDSET WITH TRANSMITTER HAVING A ONE PIECE GASKET FOR SEALING AND HOLDING OF TRANSMITTER MEMBERS

[75] Inventor: Fredrick T. Cogan, London, Canada

[73] Assignee: Northern Telecom Limited, Montreal, Canada

[21] Appl. No.: 876,262

[22] Filed: Feb. 9, 1978

[51] Int. Cl.² ............................................. H04M 1/04
[52] U.S. Cl. ...................................... 179/103; 179/179
[58] Field of Search ........... 179/100 R, 100 D, 100 C, 179/100 L, 103, 178, 179, 185, 184

[56] References Cited

U.S. PATENT DOCUMENTS

| T880,003 | 11/1970 | Spahn .............................. 179/107 R |
| 3,235,674 | 2/1966 | Mirstam ............................. 179/103 |
| 3,243,527 | 3/1966 | Sternheim ........................... 179/185 |
| 3,400,226 | 9/1968 | Krumreich et al. .................. 179/103 |
| 3,627,930 | 12/1971 | Tolman ............................ 179/100 R |
| 3,830,988 | 8/1974 | Mol et al. ........................... 179/187 |
| 4,124,785 | 11/1978 | Seretny et al. ...................... 179/178 |

FOREIGN PATENT DOCUMENTS

| 2440841 | 3/1976 | Fed. Rep. of Germany .......... 179/179 |
| 2440985 | 3/1976 | Fed. Rep. of Germany .......... 179/178 |
| 1372895 | 10/1963 | France ................................. 179/103 |
| 1180080 | 2/1970 | United Kingdom .................. 179/179 |
| 1329698 | 9/1973 | United Kingdom .................. 179/179 |

Primary Examiner—Kathleen H. Claffy
Assistant Examiner—Randall P. Myers
Attorney, Agent, or Firm—Sidney T. Jelly

[57] ABSTRACT

A telephone handset is formed from two elongate hollow concave parts, joined at their peripheries, with a circular recess at one end of the lower part. A transmitter assembly is positioned in the recess and comprises a transmitter, a cup-shaped member positioned on the back of the transmitter and a resilient tubular member surrounding the transmitter and at least the lower or front part of the cup-shaped member. The tubular member has a radially inward projecting rim at its front or lower end extending over the front of the transmitter and a similar rim at its rear end engaging over a projection on the cup-shaped member. The resilient tubular member retains the transmitter and cup-shaped member together, and acoustically seals them together and also acoustically seals the front of the transmitter to the base of the recess.

7 Claims, 9 Drawing Figures

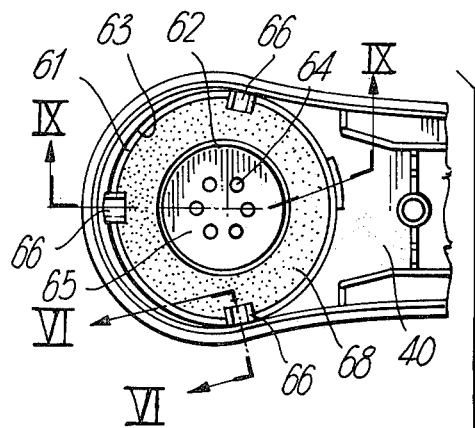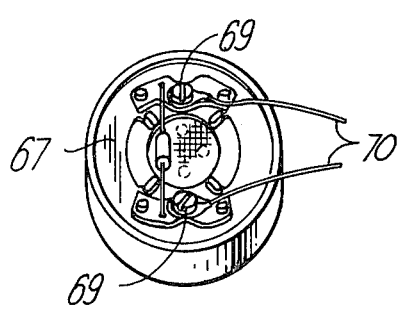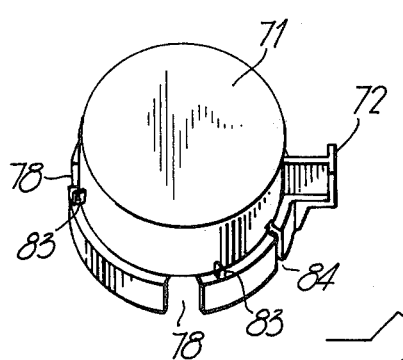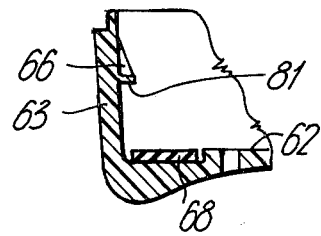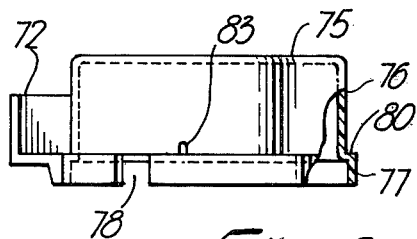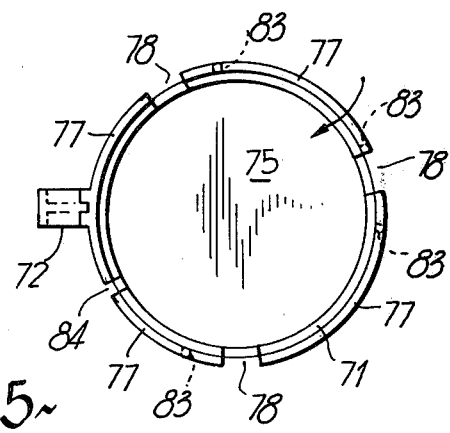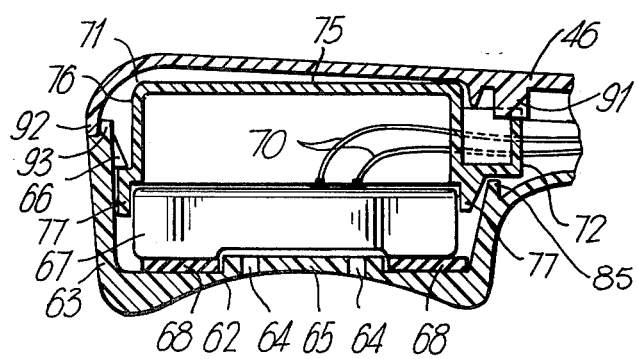

TELEPHONE HANDSET WITH TRANSMITTER HAVING A ONE PIECE GASKET FOR SEALING AND HOLDING OF TRANSMITTER MEMBERS

This invention relates to a telephone handset with a transmitter having a one piece gasket which both acts as an acoustic seal and also to hold the transmitter members together.

In a conventional telephone handset the transmitter is positioned in a recess at one end of the handset, the recess opening externally with relation to the handset. An external cover is attached to the outer end of the recess by a male thread on the outer end of the recess and a female thread in the cover. These threaded portions are expensive to produce, requiring expensive molds.

For the present invention, the handset is comprised of two parts with a recess at each end of the lower part, the recesses opening in an inward direction relative to the handset as a whole. There are no threaded portions and more simple and economic manufacture is possible.

Generally, a handset in accordance with the present invention comprises two elongate hollow concave parts, a lower part having a recess at one end, opening inwards towards the interior of the handset, and a transmitter assembly in the recess facing towards the base of the recess, which has apertures therein, the transmitter assembly comprising a transmitter, a cup shaped member positioned on the back of the transmitter and a resilient plastic tubular member surrounding the transmitter and cup shaped member, the tubular member having a radially inwardly projecting rim at a forward end acting as an acoustic seal between the front face of the transmitter and the base of the recess and a further radially projecting rim at a rear end engaging over a part of the cup-shaped member to hold the transmitter and cup-shaped member together and also acting as an acoustic seal between the transmitter and cup-shaped member. Electrical contacts extend from the cup-shaped member to the transmitter and provide attachment for conductors exterior of the cup-shaped member. The transmitter assembly is clamped in place by the top part of the handset.

The invention will be readily understood by the following description of certain embodiments by way of example, in conjunction with the accompanying drawings, in which:

FIG. 5 is an exploded perspective view of the other end of the lower part, showing recess, receiver and cover member or cup;

FIG. 6 is a cross-section on the line VI—VI of FIG. 5;

FIG. 7 is a bottom plan view of the cover member or cup;

FIG. 8 is a side plan view of the cover member or cup;

FIG. 9 is a cross-section through the receiver and of an assembled handset, generally on the line IX—IX of FIG. 5.

Figures 1, 2:
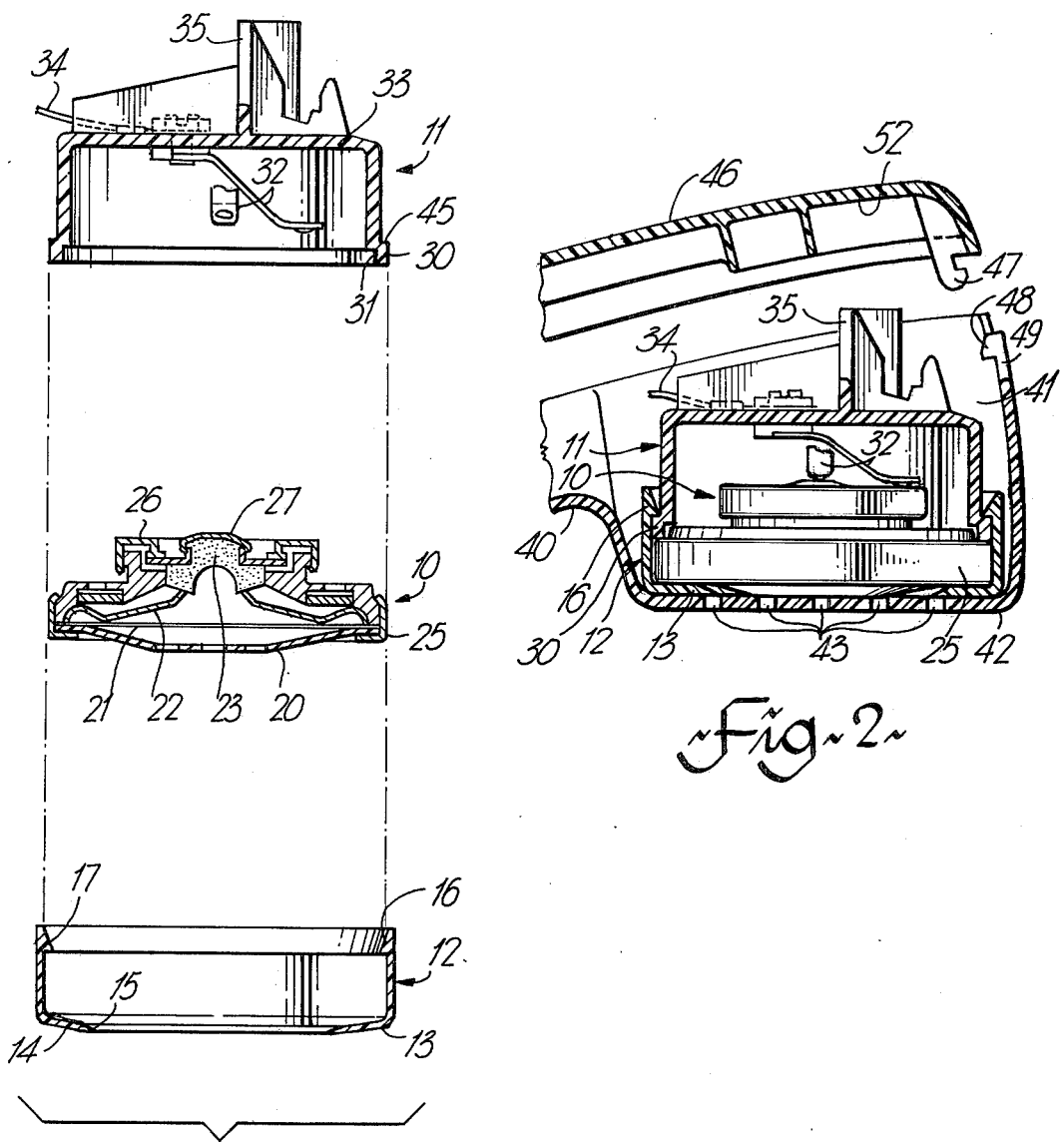
FIG. 1 is an exploded cross-section through a transmitter assembly.
FIG. 2 is a cross-section through one end of a handset, with a transmitter assembly in place and a top part of the handset adjacent thereto.

As illustrated in the drawings, and as particularly seen in FIG. 1, a transmitter assembly comprises a transmitter 10, a cup-shaped member 11 and a flexible tubular gasket 12. The gasket 12 has a radially inwardly projecting rim 13 at its lower end. The rim 13 is slightly domed or curved, presenting a convex outer surface 14. The inner edge of the rim is tapered as shown at 15. The curve and the taper provide a flexible edge for sealing, as will be described.

At the upper end of the gasket there is a further radially inwardly projecting rim 16. Rim 16 is more a thickening of the upper edge, the cross-section being tapered to give an inwardly and downwardly inclined surface 17. The inner diameter of the wall portion between the rims 13 and 16 is a close fit on the outside of the transmitter 10.

The transmitter 10 is of conventional form, having a forward apertured front end 20, a diaphragm 21, a frame 22, carbon chamber 23 held together by a metal rim 25. Contacts 26 and 27 are provided.

Figure 4:
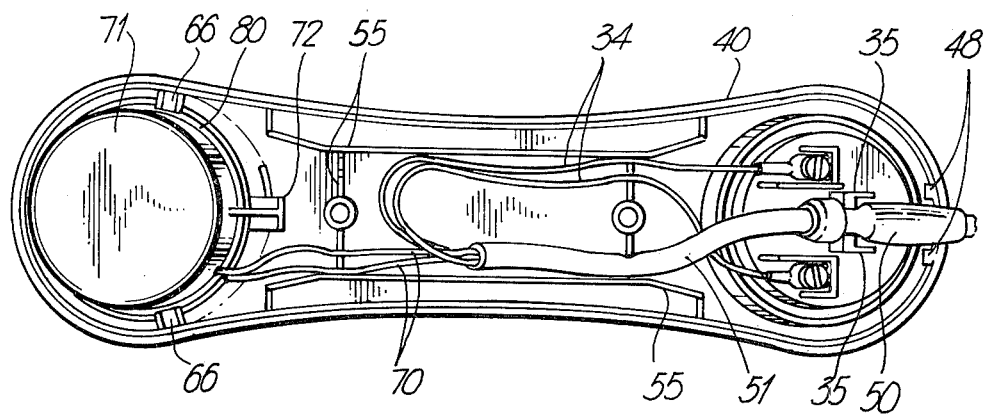
FIG. 4 is a perspective view of the lower handset part with a transmitter and a receiver in position.
Figure 3:
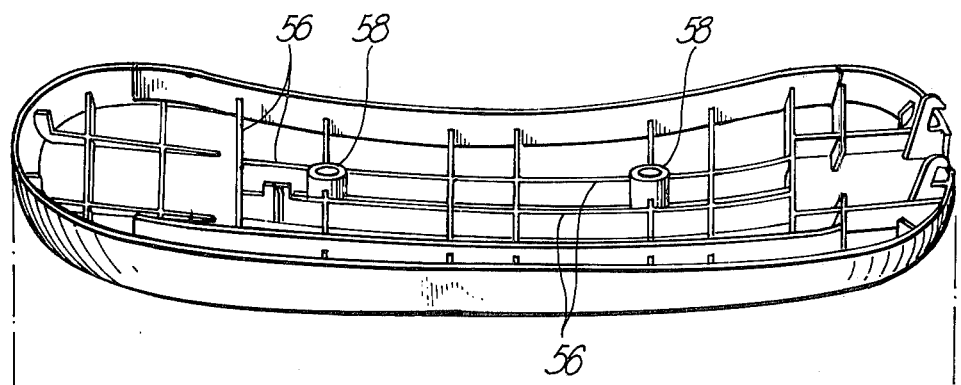
FIG. 3 is a perspective view of the two handset parts.
Figure 3:
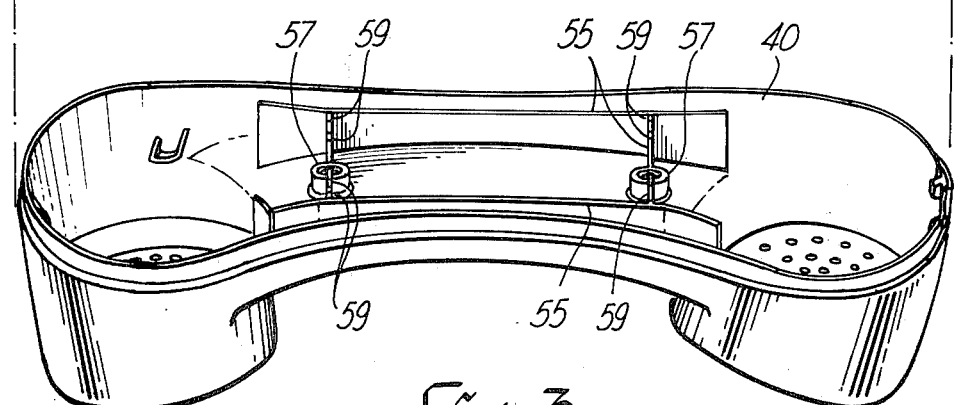

The cup-shaped member 11 has a rim 30 which is recessed on its inner surface at 31 to fit over the metal rim 25 of the transmitter. Spring contacts 32 are attached to the inner surface of the end portion 33 of the cup-shaped member, with connections extending through the end portion for attachment of conductors 34. On the back surface of the end portion 33 are two L-shaped projections 35. The projections extend in the axial direction and serve two purposes. Firstly, they are spaced apart such that a grommet on the line cord to the handset is gripped firmly between the projections, an enlargement of the grommet engaging behind the projections as seen in FIGS. 3 and 4, and acting as a strain relief to prevent inadvertent pulling of the various conductors in the handset by the telephone user. Secondly, the projections extend a distance such that on assembly together of the two handset parts, the inner surface of the top part will push on the ends of the projections 35 pressing the transmitter assembly into tight sealing engagement with the base of the recess in the lower part of the handset.

FIG. 2 illustrates the arrangement of the transmitter assembly in the recess in the lower part of the handset with the line cord omitted, for clarity. The lower part of the handset is indicated at 40 with inwardly opening recess 41. The recess 41 has an apertured base 42, the apertures indicated at 43, for transmission of sound therethrough. The transmitter assembly drops into the recess 41 with the outside diameter of the gasket 12 being a fairly close fit in the recess. The transmitter assembly is assembled by pressing the transmitter 10 into the gasket past the top rim 16, the apertured front 20 extending within the rim 13 of the gasket. The rim 30 of the cup-shaped member 11 is then pushed into the gasket 12, the rim 16 snapping over the rim 30 and engaging with the back surface 45 of the rim.

In FIG. 2, the top part of the handset is indicated at 46. In the particular example illustrated, the top part is attached to the lower part at one end in the present example, the transmitter end, by two spaced hooked members 47 which engage under projections 48 on the inside of the recess 41. The projections are more readily seen in FIG. 3, being positioned either side of a slot 49 in the end of the handset part in which fits the grommet 50 of the line cord 51.

After positioning the transmitter assembly into the recess 41, the line cord grommet 50 is pressed down into the slot 49 and also between the projections 35 on the cup-shaped member 11. The top part is then presented to the lower part in such a manner that the hooked members 47 engage under the projections 48. The top part is then rotated down into engagement with the lower part and the inner surface of the top part, at 52, engages with, and presses down on, the top of the projections 35. This pressure flexes the tapered rim 13 on the gasket 12 against the base 42 of the recess giving a good acoustic seal.

FIG. 3 illustrates the two parts of a handset, separated, without the transmitter and receiver therein, while FIG. 4 illustrates the lower part of the handset with a transmitter assembly in one end and a receiver in the other end. The transmitter is as described above and the receiver is conveniently as described in co-pending application Ser. No. 876,211 filed Feb. 9, 1978, now U.S. Pat. No. 4,130,740, issued Dec. 19, 1978, and also described below, although other forms of receiver assembly can be used. As seen, the two parts are relatively simple moldings with no internal coring required. Stiffening ribs 55 are provided in the portion of the lower part between the recesses. Similarly stiffening ribs 56 are provided in the top part.

Bosses 57 are provided in the lower part, in which trapped screws are positioned, the screws being screwed into bosses 58 in the top part. Slots 59 are provided in the cross ribs 55 for positioning of conductors therein. With the particular form of attachment of the top part to the lower part as described above only one screw need be provided, near the receiver end, but two are provided, mainly for cosmetic reasons.

The particular form of receiver assembly, as illustrated in FIGS. 5 to 9 fits into the other end of the lower handset part 40, in a recess 61 opening from the inside of the handset, having a base 62 and side wall 63.

Apertures 64 are formed in the central portion 65 of the base 62 for access to a receiver in the recess. Formed on the wall 63 are three lugs or projections 66 spaced round the recess. As will be described, projections 66 are spaced a distance from the base 62 to engage with a cover member or cup.

A receiver 67 fits into the recess 61 resting on a resilient ring 68 positioned on the base 62 around the central portion 65. Connections 69 are provided on the top of the receiver 67 for the conductors 70. A cover member or cup 71 fits onto the receiver and engages with the projections 66. The cup 71 has a radially extending arm 72 by which the cup can be rotated.

The form of a projection 66 can be seen in FIG. 6. All three projections 66 are normally of the same form. As illustrated in FIGS. 7 and 8, the cup 71 has a top member 75 and side wall 76. A rim 77 extends round the base of the wall 76, on the outside of the cup and the arm 72 extends radially near the top of the cup. Slots 78, are formed in the rim, the slots positioned so that when the cup is dropped into the recess over a receiver, each projection 66 will pass through a slot 78. In position the top edge 80 of the rim 77 is level with the bottom surfaces 81 of the projections 66. By rotating the cup by the arm 72 the rim engages under the projections 66. Small pips or projections 83 are formed on the rim 77 to limit rotational movement of the cup. A further slot 84 is provided for passage of the conductors 70 from the receiver.

The arm 72 rests on, and slides on, a short section 85 extending from the wall 63 of the recess 61. This will prevent tipping of the cup when the arm is pushed to rotate the cup.

FIG. 9 illustrates the receiver 67 and cup 71 assembled in recess 68 in the lower handset part and the other or top handset part assembled to the lower part, in cross-section. The engagement of the rim 77 under projections 66 is seen. In rotating the cup a small amount of pressure is maintained on the top 75 of the cup 71 to push the receiver into firm engagement with the resilient ring 68 to provide an acoustic seal.

The top part has a downwardly extending rib 91 which, when the cup 61 is rotated correctly, engages with one side of the arm 72 to prevent rotation back of the cup, with consequent unlocking of cup and receiver. It is not possible to completely close the top part onto the lower part until the arm is rotated to the correct position as the rib 91 will be in interference with the arm 72.

The two parts of the handset are of hollow concave form and are provided with interengaging formations 92 and 93 at their rims to provide location and a seal. The two parts are very easy to mold as compared to many normal handsets which are of one piece construction and formed as a hollow structure. It is necessary, for cost and weight purposes and to provide a passage for conductors, that the portion joining the receiver end and the transmitter end be hollow and this is more difficult and expensive to produce than the relatively inexpensive molding of the handset parts for the present invention.

What is claimed is:

1. A telephone handset having an elongate top part and an elongate lower part, each part of hollow concave form and adapted to fit together at their peripheries, said lower part housing a receiver and a transmitter, said lower part formed at one end to define a circular recess having a perforated base and a side wall extending upward from said base, and a transmitter assembly in said recess, said transmitter assembly comprising: a transmitter having a front face facing towards and in close proximity to said base, a cup-shaped member positioned on the back of the transmitter and including an outwardly projecting rim at a front end, and a resilient tubular member surrounding the transmitter and the lower part of the cup-shaped member, said tubular member including a first radially inward projecting rim at a forward end extending over the periphery of the front face of the transmitter and having a front face in contact with said perforated base, at least one projection extending upward from a top surface of said cup-shaped member, said top part of said handset in pressure contact with an upper end of said projection whereby said front face of said first radially inward projecting rim is in deformed acoustically sealing pressure contact between said front face of said transmitter and said perforated base, and a second radially inward extending rim at a rear end engaging over said outwardly projecting rim of the cup-shaped member, to retain said transmitter and said cup-shaped member together and acoustically sealing between said transmitter and said cup-shaped member.

2. A handset as claimed in claim 1, said first radially inward projecting rim having a tapered inner edge, in radial cross-section, for flexibly sealing against said base of said recess.

3. A handset as claimed in claim 1, including two spaced apart projections extending upward from said top surface for engagement by a grommet on a handset cord for strain relief.

4. A handset as claimed in claim 1, said lower part formed at each end to define a recess at each end, each recess having a base and a side wall, and interengaging formations at one end of each of said top and lower parts.

5. A handset as claimed in claim 4, said interengaging formations at said end of the top and bottom parts, comprising: inwardly directed projections on the inside of the side wall of the recess of said end, and hook members on the end of said top member, said hook members engaging under said projections.

6. A handset as claimed in claim 5, including a slot in said side wall for reception of a handset cord therein, said inwardly directed projections spaced apart, one on each side of said slot.

7. A handset as claimed in claim 4, said interengaging formations at the end housing said transmitter.

* * * * *